(12) United States Patent
Chiang et al.

(10) Patent No.: US 8,781,177 B2
(45) Date of Patent: Jul. 15, 2014

(54) METHOD AND COMPUTER PROGRAM PRODUCT FOR EXTRACTING FEATURE VECTORS FROM A PALM IMAGE

(75) Inventors: Ching-Tai Chiang, Kaohsiung (TW);
Rong-Ching Wu, Kaohsiung (TW);
Chen-Sen Ouyang, Kaohsiung (TW);
Jong-Ian Tsai, Kaohsiung (TW)

(73) Assignee: I Shou University, Kaohsiung (TW)

( * ) Notice: Subject to any disclaimer, the term of this patent is extended or adjusted under 35 U.S.C. 154(b) by 352 days.

(21) Appl. No.: 13/179,411

(22) Filed: Jul. 8, 2011

(65) Prior Publication Data
US 2013/0011022 A1    Jan. 10, 2013

(51) Int. Cl.
*G06K 9/00*    (2006.01)
(52) U.S. Cl.
CPC .................................. *G06K 9/00006* (2013.01)
USPC ........................... 382/115; 382/124; 382/125

(58) Field of Classification Search
CPC ..................................... G06K 9/00006–9/0012
USPC ......... 382/115, 116, 124, 125, 190–195, 197, 382/199, 203–204, 266
See application file for complete search history.

(56) References Cited

U.S. PATENT DOCUMENTS

2009/0046331 A1* 2/2009 Dufresne de Virel ......... 358/474
2010/0266169 A1* 10/2010 Abiko ........................... 382/124

* cited by examiner

*Primary Examiner* — Brian Le
(74) *Attorney, Agent, or Firm* — Alan Kamrath; Kamrath IP Lawfirm, P.A.

(57) ABSTRACT

A method for extracting feature vectors from a palm image includes the steps of: determining a palm contour in the palm image, and labeling pixels on the palm contour as contour pixels in order along the palm contour; determining a rotation angle of the palm contour relative to a coordinate system; obtaining corrected contour pixels to offset the rotation angle; determining a plurality of feature points from the corrected contour pixels; obtaining a plurality of sub-images from the palm image with reference to the feature points, one of the sub-images corresponding to a palm center and another one of the sub-images corresponding to a corresponding palm finger; and determining the feature vectors with reference to the sub-images, each of the feature vectors corresponding to a corresponding one of the sub-images.

12 Claims, 13 Drawing Sheets

METHOD AND COMPUTER PROGRAM PRODUCT FOR EXTRACTING FEATURE VECTORS FROM A PALM IMAGE

BACKGROUND OF THE INVENTION

1. Field of the Invention

The invention relates to a palm biometric recognition method, more particularly to a palm biometric recognition method that is capable of effectively recognizing palms placed in various directions and at various angles.

2. Description of the Related Art

Palm recognition technique is one of the mainstream biometric identification techniques due to its relatively low cost and high identification rate.

In an article entitled "*A biometric identification system based on eigenpalm and eigenfinger features*" by Ribaric S., et al. and published in the "IEEE Transactions on Pattern Analysis and Machine Intelligence," Vol. 27, No. 11 in November, 2005, there is proposed a biometric identification system by extracting eigenpalm and eigenfinger features from sub-images of palm and fingers. However, this prior art is not robust enough, especially in the condition that the palm in the image is inclined or when there are background illumination changes.

In an article entitled "*Palm Line Extraction and Matching for Personal Authentication*" by Wu., X., et al. and published in the "IEEE Transactions on Systems, Man, and Cybernetics—Part A: Systems and Humans," Vol. 36, No. 5 in September 2006, there is proposed an approach for palm line extraction and matching with chaining coding. However, the coding method is too sensitive to the extracted palm lines.

In an article entitled "*Hierarchical Identification of Palmprint using Line-based Hough Transform*" by Li, F., et al. and an article entitled "*A Hierarchical Palmprint Identification Method Using Hand Geometry and Grayscale Distribution Features*" by Wu, J., et al., and both published in "The 18$^{th}$ International Conference on Pattern Recognition" in 2006, there are proposed two approaches for palmprint identification using hierarchical processing. However, these two approaches are too sensitive to the rotation and position of the palm in the image.

In an article entitled "*An Adaptive Biometric System Based on Palm Texture Feature and LVQ Neural Network*" by Ouyang, C.-S., et al. and published in "The Proceedings of 21st International Conference on Industrial, Engineering & Other Applications of Applied Intelligent Systems", 2006, there is proposed a more robust feature extraction and learning mechanism for palm biometric system. However, it has a limitation in that the rotation angle of the palm in the image cannot be more than 50 degrees.

Therefore, in order to alleviate the limitations of the prior art, there is the need for a palm feature extraction method and a palm biometric system that allow a user to scan his/her palm at any position and in any rotation conditions.

SUMMARY OF THE INVENTION

Therefore, the object of the present invention is to provide a method and a computer program product for extracting feature vectors from a palm image.

According to one aspect of the present invention, there is provided a method for extracting feature vectors from a palm image. The method includes the steps of:

(A) determining a palm contour in the palm image, and labeling pixels on the palm contour as contour pixels in order along the palm contour;

(B) determining a rotation angle of the palm contour relative to a coordinate system;

(C) obtaining corrected contour pixels to offset the rotation angle;

(D) determining a plurality of feature points from the corrected contour pixels;

(E) obtaining a plurality of sub-images from the palm image with reference to the feature points, one of the sub-images corresponding to a palm center and another one of the sub-images corresponding to a corresponding palm finger; and (F) determining the feature vectors with reference to the sub-images, each of the feature vectors corresponding to a corresponding one of the sub-images.

Step (D) includes the sub-steps of:

(D-1) setting local maxima of the corrected contour pixels as fingertip points;

(D-2) setting local minima of the corrected contour pixels located between two of the fingertip points as valley points;

(D-3) finding, from among the corrected contour pixels, two pixels as reference points, each of the reference points and a corresponding extreme one of the valley points being symmetrical to each other relative to a corresponding extreme one of the fingertip points;

(D-4) if it is determined that one of the fingertip points corresponds to an index fingertip point, finding, from among the rotated contour pixels, one pixel as another reference point, said another reference point and one of the valley points which is adjacent to said one of the fingertip points and whose distance from said one of the fingertip points is smaller than the other one of the valley points adjacent to said one of the fingertip points being symmetrical to each other relative to said one of the fingertip points, and (D-5) for each of the fingertip points, finding pairs of the corrected contour pixels as cross points that correspond to the fingertip point, each pair of the corrected contour pixels intersecting a corresponding reference line which is perpendicular to a symmetry line that extends from the fingertip point to a midpoint between an adjacent pair of the valley and reference points, and which is spaced apart from the fingertip point by a distance that is equal to a corresponding fraction of a length of the symmetry line.

Step (E) includes the sub-steps of:

(E-1) finding one pixel of the palm image located on a corner of a square that has one side which is composed by a predetermined pair of the reference points, and that does not enclose any of the fingertip points, and setting said one pixel as a palm reference point, the corner being diagonally opposite to one of the reference points in the predetermined pair;

(E-2) taking the region of the palm image enclosed by connecting the palm reference point, at least one of the valley points, and the reference points as the sub-image corresponding to the palm center; and (E-3) taking the region of the palm image enclosed by connecting one of the fingertip points, the cross points corresponding to said one of the fingertip points, and the adjacent pair of the valley and reference points of said one of the fingertip points as said another one of the sub-images that corresponds to the corresponding palm finger.

According to another aspect of the present invention, there is provided a computer program product, comprising a computer readable storage medium that includes program instructions, which when executed by an electronic device, cause the electronic device to perform the method of this invention.

BRIEF DESCRIPTION OF THE DRAWINGS

Other features and advantages of the present invention will become apparent in the following detailed description of the preferred embodiment with reference to the accompanying drawings, of which.

DETAILED DESCRIPTION OF THE PREFERRED EMBODIMENT

Figure 1:
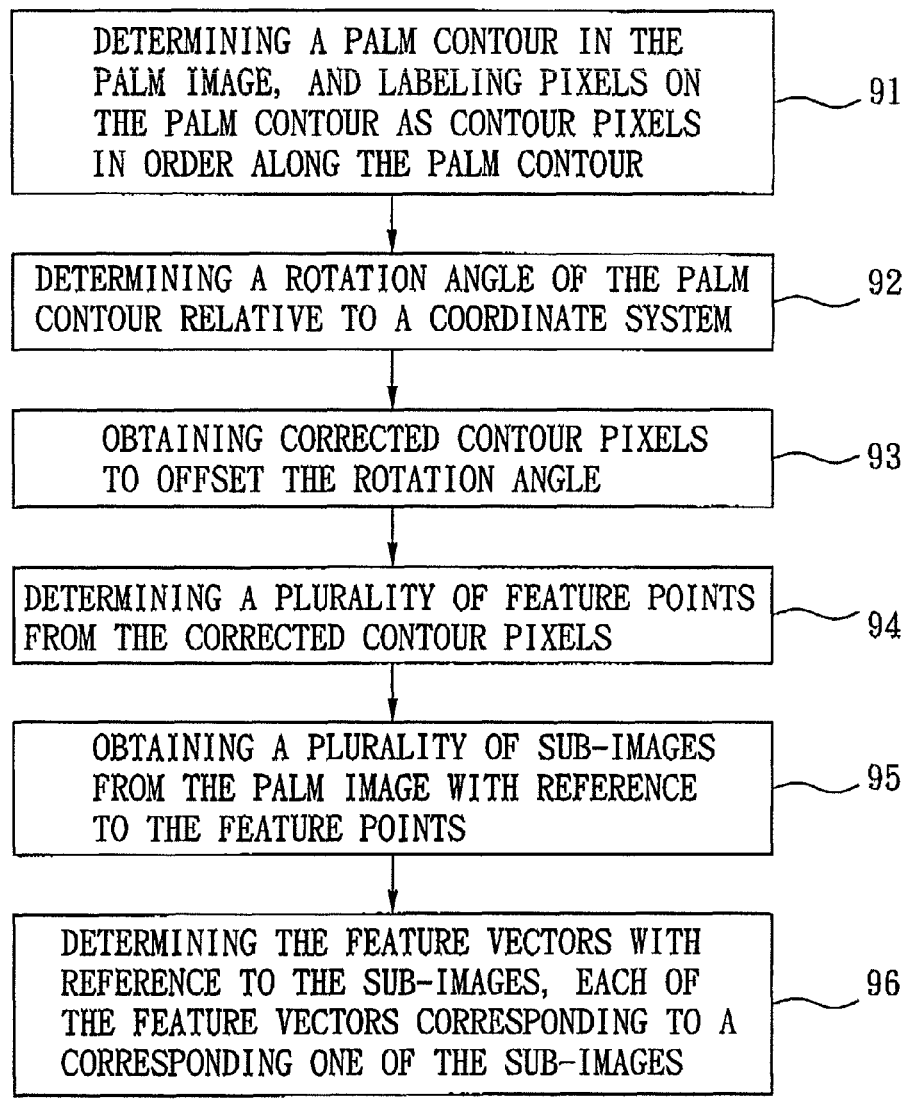
FIG. 1 is a flow chart illustrating the preferred embodiment of a method for extracting feature vectors from a palm image according to the present invention.

With reference to FIG. 1, a biometric system based on palm texture feature normally includes two stages, one being the registration stage and the other being the identification and verification stage.

In the registration stage, palm feature vectors of a registering entity is used to obtain, through a learning vector quantization algorithm (e.g., LVQ, LVQ2), a representative prototype that corresponds to the registering entity and that is to be stored in a registration user database. The representative prototype normally includes six feature vectors, one of which being representative of a palm center, while the others being respectively representative of five palm fingers.

In the identification and verification stage, feature vectors of a to-be-identified entity are obtained for comparison with the representative prototype stored in the registration user database to determine whether the to-be-identified entity is the registered entity in order to permit or block access of the to-be-identified entity into, for example, a network, protected by the biometric system.

The present invention puts emphasis in how to effectively obtain a set of feature vectors of an entity (whether a registering entity or a to-be-identified entity) for subsequent development of a representative prototype or for subsequent identification and verification purposes.

Figure 2:
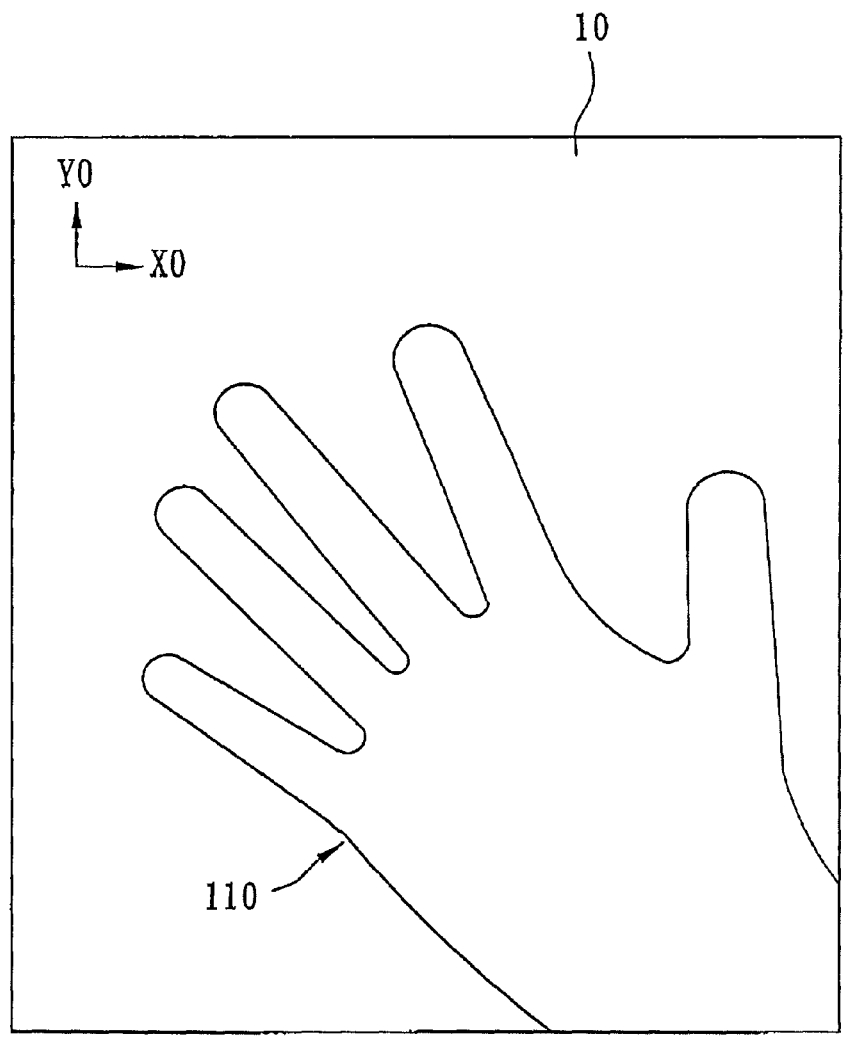
FIG. 2 is a schematic diagram of a palm image.
Figure 11:
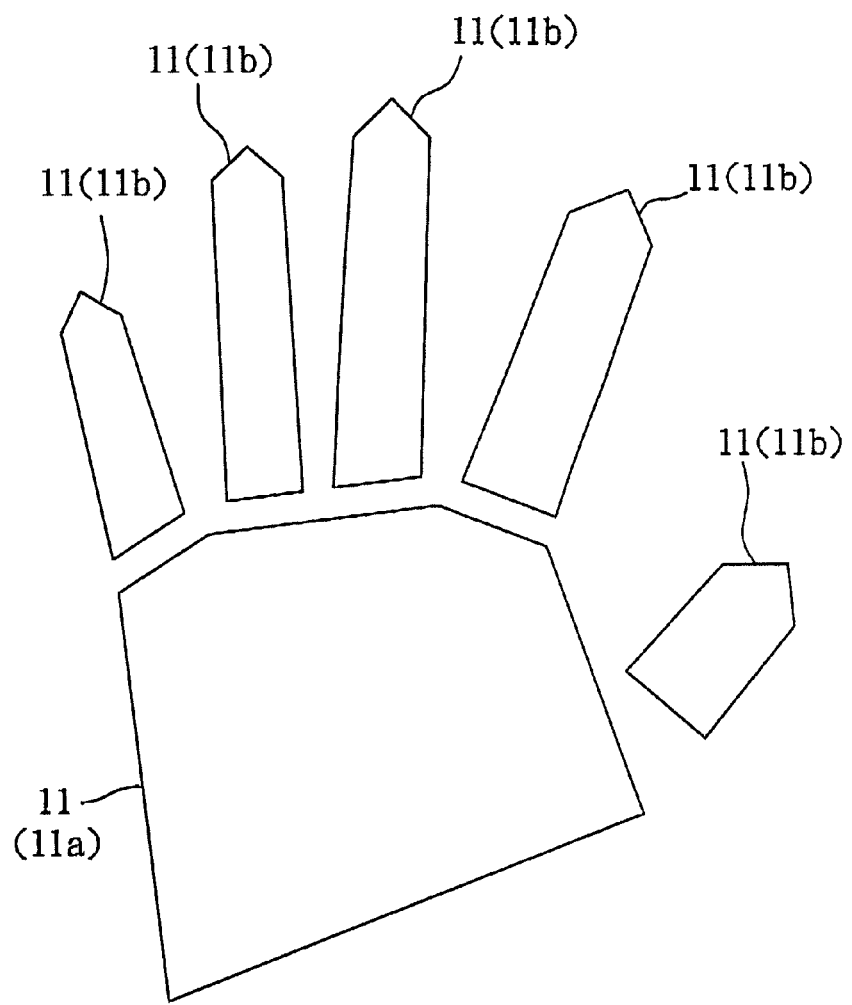
FIG. 11 is a schematic diagram, illustrating six sub-images of the palm image, each corresponding to a corresponding one of the palm center and palm fingers.

Shown in FIG. 1 is the preferred embodiment of a method for extracting feature vectors from a palm image 10 (as shown in FIG. 2). The method includes four main steps 91~94. In step 91, a palm contour 110 in the palm image 10 is determined, and pixels on the palm contour are labeled as contour pixels in order along the palm contour 110. In step 92, a rotation angle of the palm contour 110 relative to a coordinate system (X0-Y0) is determined. In step 93, corrected contour pixels are obtained to offset the rotation angle. In step 94, a plurality of feature points are determined from the corrected contour pixels. In step 95, a plurality of sub-images 11 (as shown in FIG. 11) are obtained from the palm image 10 with reference to the feature points (i.e., the fingertip points (T1~T5), the valley points (B1~B4), and the reference points (K1~K3)). In step 96, the feature vectors are determined with reference to the sub-images 11. Each of the feature vectors corresponds to a corresponding one of the sub-images 11.

Figure 3:
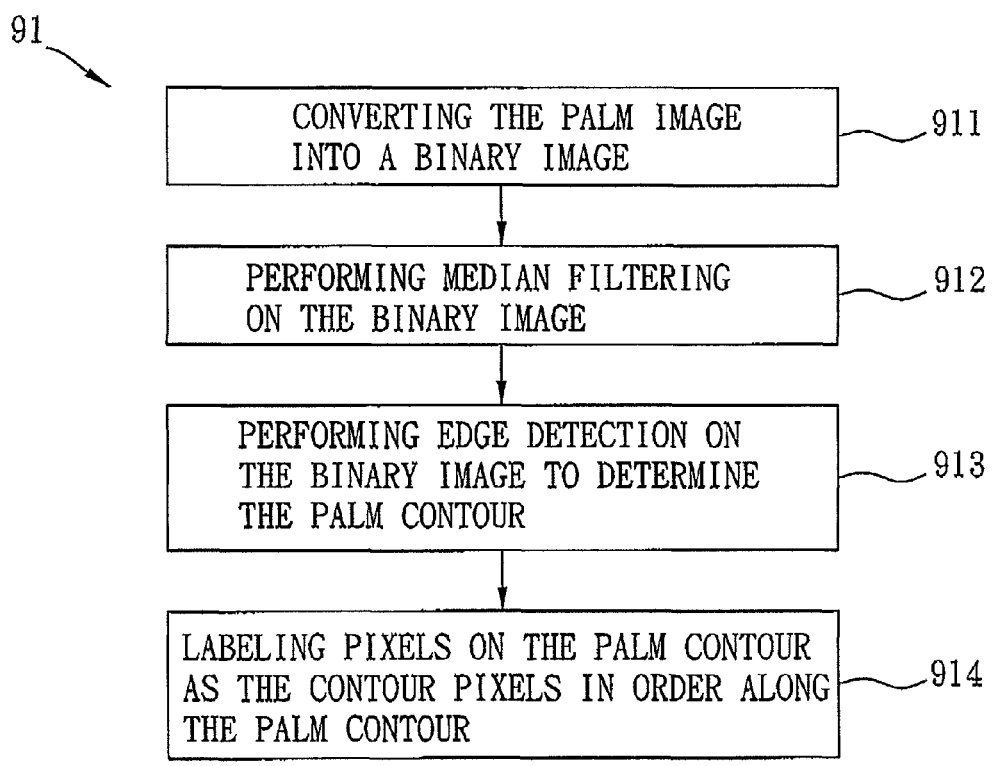
FIG. 3 is a flow chart illustrating the sub-steps of step 91 of the method.

With reference to FIG. 3, in this embodiment, step 91 includes four sub-steps 911~914.

In sub-step 911, the palm image 10 is converted into a binary image. In particular, each pixel in the palm image 10 has a pixel value in terms of grayscale level. If the pixel value of a pixel in the palm image 10 is greater than a predetermined threshold (T), this pixel is represented as a black pixel in the binary image; otherwise, this pixel is represented as a white pixel in the binary image. The threshold (T) is determined according to the following equation (F.1).

$$T = \frac{1}{M \times N} \sum_{x=0}^{M-1} \sum_{y=0}^{N-1} g(x, y) \tag{F.1}$$

where M×N is the resolution or size of the palm image 10 and g (x, y) is the grayscale level of the pixel at position (x, y). Essentially, the threshold (T) is set as the average of the grayscale levels of the pixels in the palm image 10.

In sub-step 912, median filtering is performed on the binary image. This sub-step is performed to reduce noise in the background of the binary image.

In sub-step 913, edge detection is performed on the binary image to determine the palm contour 110. In this embodiment, edge detection is performed utilizing Laplacian filtering.

In sub-step 914, pixels on the palm contour 110 are labeled as the contour pixels in order along the palm contour 110.

Figure 4A:
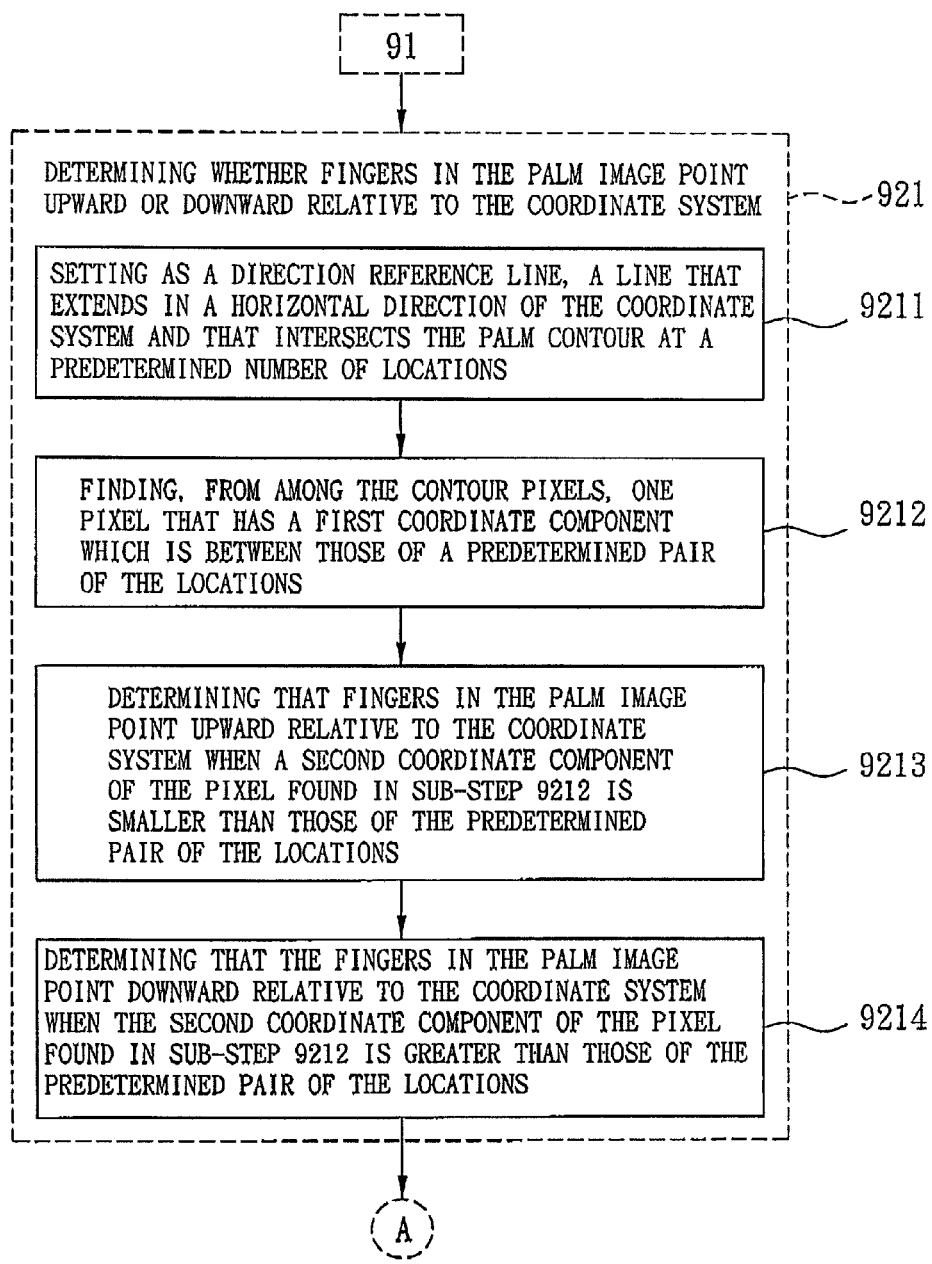
FIGS. 4A-4C cooperatively define a flow chart for illustrating the sub-steps of step 92 of the method.

Referring to FIG. 1 and FIG. 4A, in this embodiment, the rotation angle of the palm contour 110 relative to the coordinate system (X0-Y0) is determined in step 92 with reference to the contour pixels. Further, step 92 includes four sub-steps 921~924.

In sub-step 921, it is determined whether fingers in the palm image 10 point upward or downward relative to the coordinate system (X0-Y0). In this embodiment, sub-step 921 includes the following sub-steps, which are described hereunder with further reference to FIG. 5.

In sub-step 9211, a line that extends in a horizontal direction (X0) of the coordinate system (X0-Y0) and that intersects the palm contour 110 as determined in step 91 at a predetermined number of locations is set as a direction reference line (Ldir). In this embodiment, assuming that there are five palm fingers in the palm image 10, the predetermined number of locations is eight, and the locations are labeled (P1), (P2), (P3), (P4), (P5), (P6), (P7) and (P8).

In sub-step 9212, from among the contour pixels, one pixel that has a first coordinate component which is between those of a predetermined pair of the locations (P1~P8) is found. In this embodiment, the first coordinate component is in the horizontal direction (X0), the predetermined pair of the locations includes the second and the third locations (P2), (P3), and the pixel found in sub-step 9212 is labeled (Pref). Preferably, the first coordinate component of this pixel (Pref) is substantially the same as that of a midpoint (PM1) between the predetermined pair of the locations (P2, P3).

It is determined in sub-step 9213 that the fingers in the palm image 10 point upward relative to the coordinate system (X0, Y0) when a second coordinate component of the pixel (Pref) found in sub-step 9212 is smaller than those of the predetermined pair of the locations (P2, P3). On the contrary, it is determined in sub-step 9214 that the fingers in the palm image 10 point downward relative to the coordinate system (X0,Y0) when the second coordinate component of the pixel (Pref) found in sub-step 9212 is greater than those of the predetermined pair of the locations (P2, P3). In this embodiment, the second coordinate component is in a vertical direction (Y0) orthogonal to the horizontal direction (X0), and pointing upward means pointing in the (+Y0) direction, while pointing downward means pointing in the (−Y0) direction.

Figure 4B:
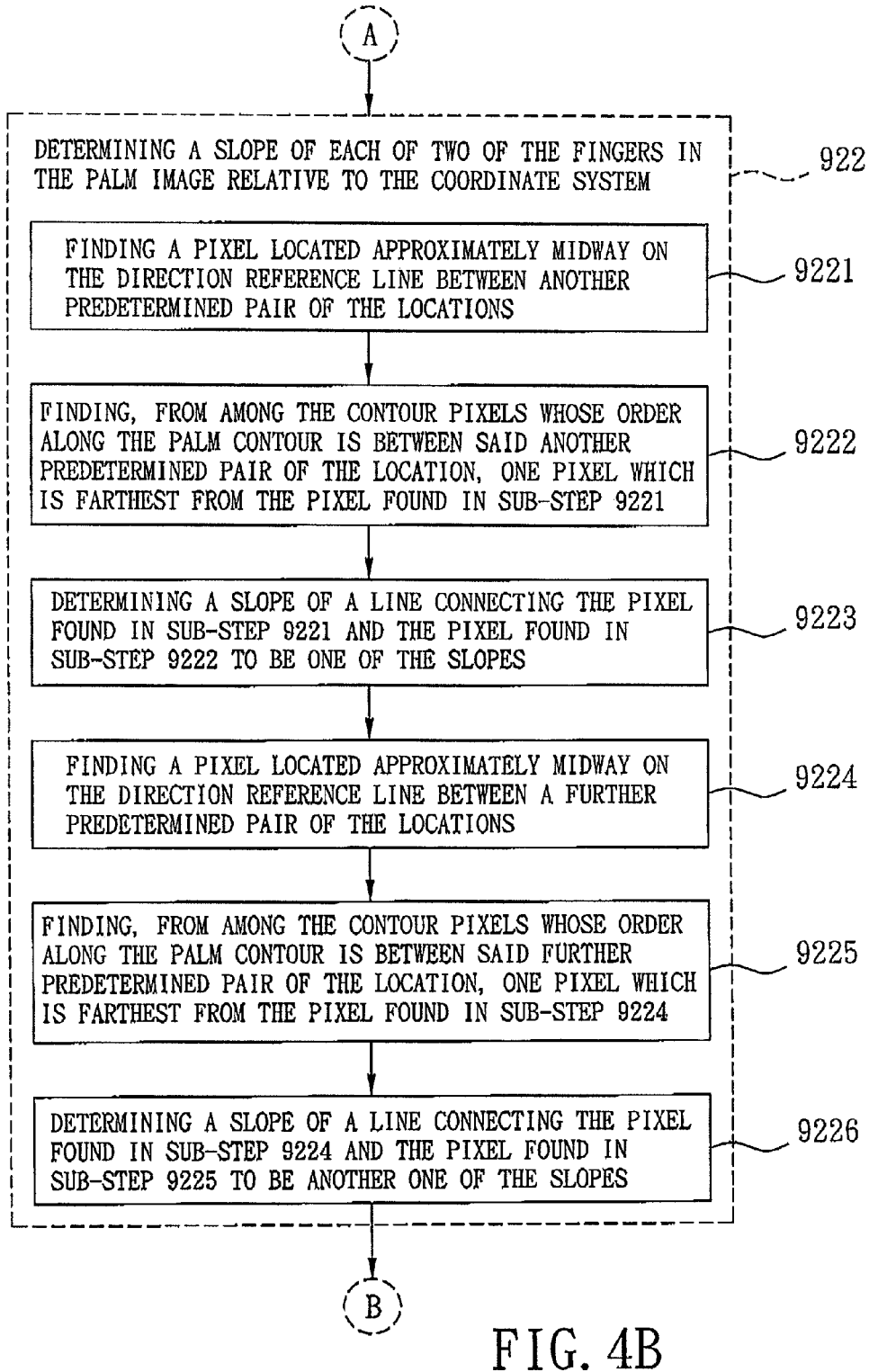

Referring to FIG. 4B, in sub-step 922, a slope of each of two of the fingers in the palm image 10 relative to the coordinate system (X0-Y0) is determined. In this embodiment, the two fingers include the middle finger and one of the index finger and the ring finger, and sub-step 922 includes the sub-steps 9221~9226.

Figure 5:
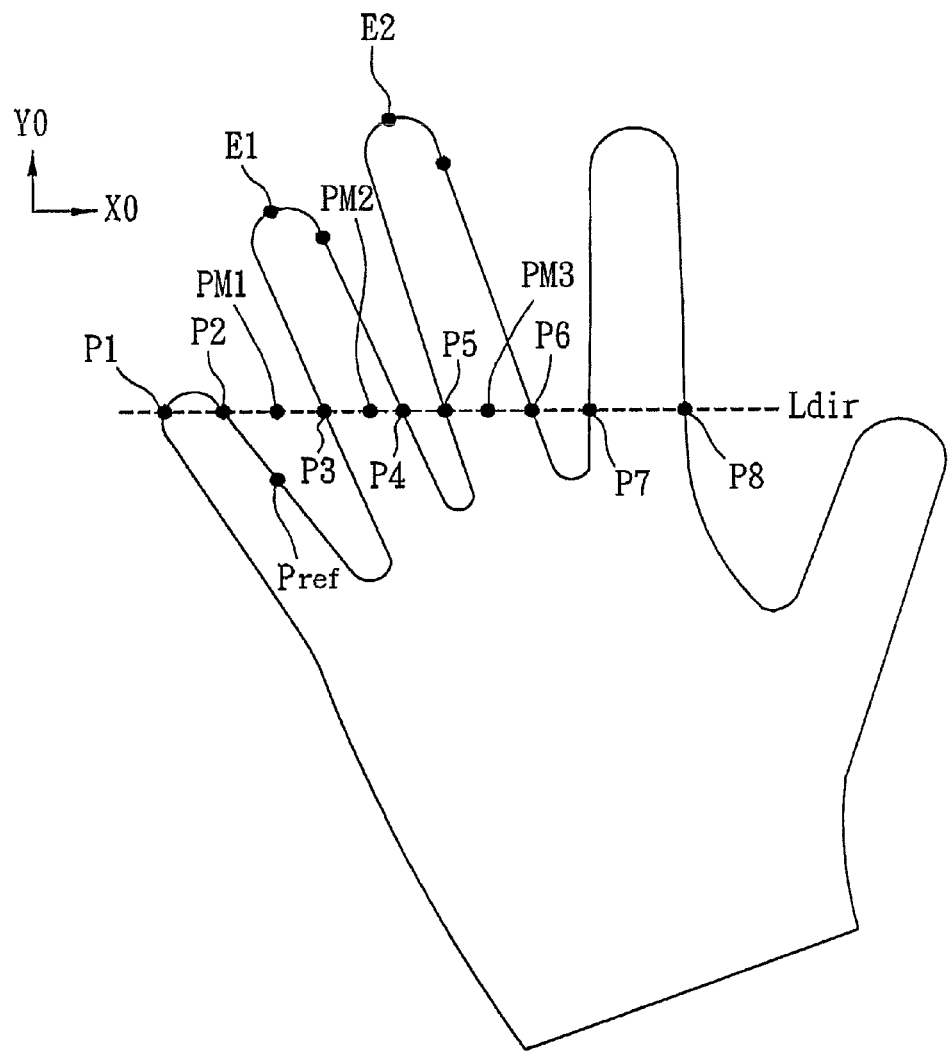
FIG. 5 is a schematic diagram of the palm image, illustrating how to determine a rotation angle of a palm contour relative to a coordinate system (X0-Y0)

With further reference to FIG. 5, in sub-step 9221, a pixel located approximately midway on the direction reference line (Ldir) between another predetermined pair of the locations (P1~P8) is found. In this embodiment, said another predetermined pair of the locations includes the third and fourth locations (P3), (P4), and the pixel found in sub-step 9221 is labeled (PM2).

In sub-step 9222, from among the contour pixels whose order along the palm contour 110 is between said another predetermined pair of the location (P3, P4), one pixel which is farthest from the pixel found in sub-step 9221 (PM2) is found and is labeled (E1).

In sub-step 9223, a slope of a line, connecting the pixel found in sub-step 9221 (PM2) and the pixel found in sub-step 9222 (E1) is determined to be one of the slopes.

In sub-step 9224, a pixel located approximately midway on the direction reference line (Ldir) between a further predetermined pair of the locations is found. In this embodiment, said further predetermined pair of the locations includes the fifth and sixth locations (P5), (P6), and the pixel found in sub-step 9224 is labeled (PM3).

In sub-step 9225, from among the contour pixels whose order along the palm contour 110 is between said further predetermined pair of the location (P5, P6) one pixel which is farthest from the pixel found in sub-step 9224 (PM3) is found and is labeled (E2).

In sub-step 9226, a slope of a line connecting the pixel found in sub-step 9224 (PM3) and the pixel found in sub-step 9225 (E2) is determined to be another one of the slopes.

Figure 4C:
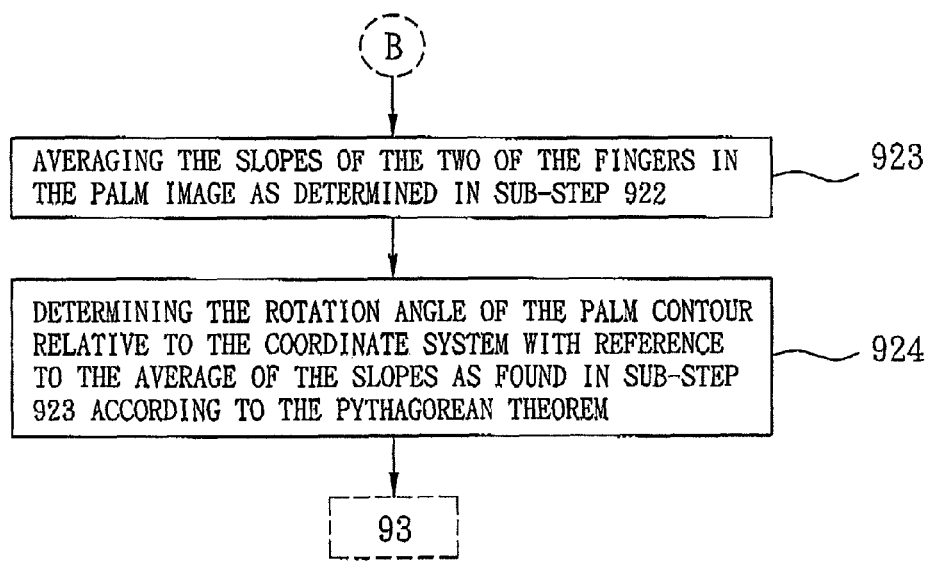

With reference to FIG. 4C, in sub-step 923, the slopes of the two of the fingers in the palm image 10 as determined in sub-step 922 are averaged. Subsequently, in sub-step 924, the rotation angle of the palm contour 110 relative to the coordinate system (X0-Y0) is determined with reference to the average of the slopes as found in sub-step 923 according to the Pythagorean Theorem. For example, when the average of the slopes is equal to one, the rotation angle is determined to be 45 degrees.

Referring back to FIG. 1, the corrected contour pixels are obtained in step 93 to offset the rotation angle. As a person having ordinary skill in the art would readily appreciate, there exist multiple ways to achieve the effect of offsetting the rotation angle of the palm contour 110, such as by transforming the coordinate system (X0-Y0) into another coordinate system (X1-Y1), or by rotating the palm image 10. The present invention is not limited in the way that the offset is achieved, or that the corrected contour pixels are obtained.

Figure 6:
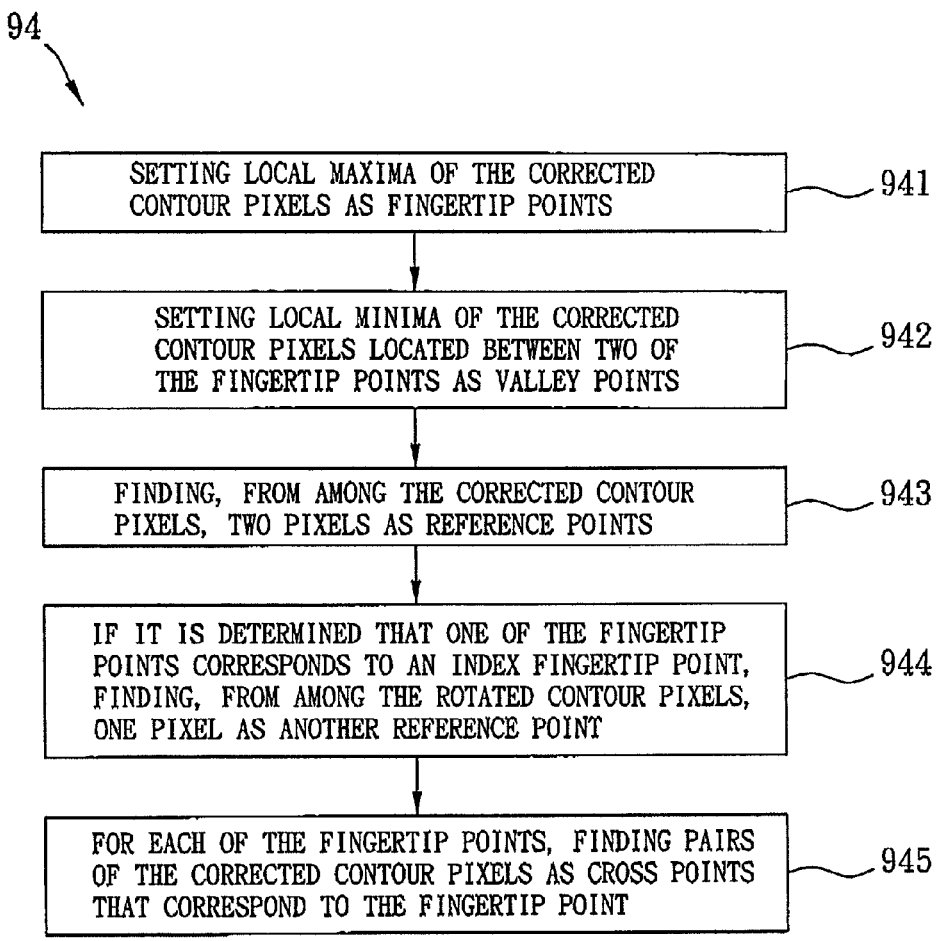
FIG. 6 is a flow chart, illustrating the sub-steps of step 94 of the method.
Figure 7:
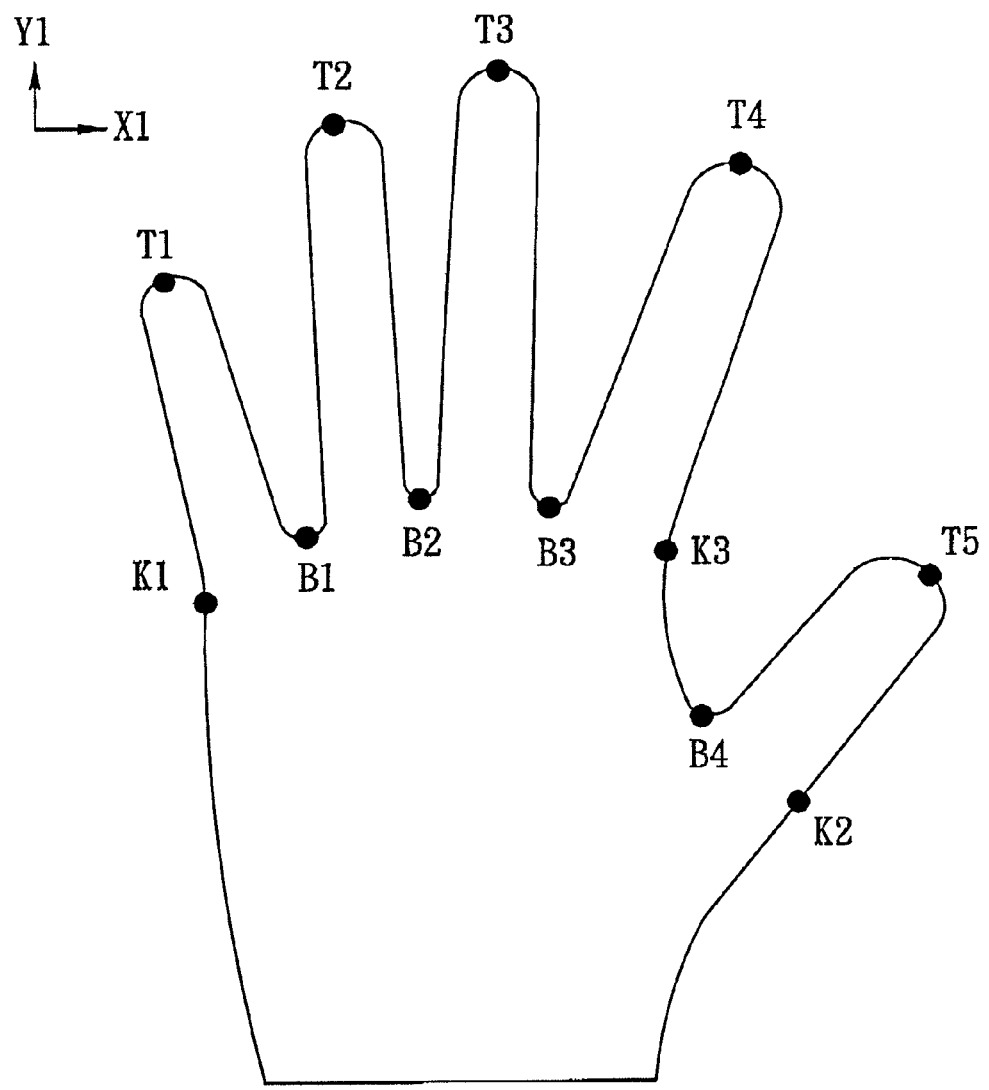
FIG. 7 is a schematic diagram of the palm image in another coordinate system (X1-Y1), illustrating a plurality of feature points on the palm contour.

With reference to FIG. 6 and FIG. 7, in this embodiment, step 94, where the feature points are determined from the corrected contour pixels, includes the following sub-steps.

In sub-step 941, local maxima of the corrected contour pixels are set as fingertip points, and in sub-step 942, local minima of the corrected contour pixels located between two of the fingertip points are set as valley points. Specifically, the corrected contour pixels are searched in order along the palm contour 110 to find local maxima and minima. In the example shown in FIG. 7, five fingertip points are found and are respectively labeled as (T1), (T2), (T3), (T4) and (T5), and four valley points are found and are respectively labeled as (B1), (B2), (B3) and (B4). In addition, the fingertip point (T2) is the pixel (E1) found in sub-step 9222, and the fingertip point (T3) is the pixel (E2) found in sub-step 9225.

Subsequently, in sub-step 943, from among the corrected contour pixels, two pixels are found as reference points (K1, K2). Each of the reference points (K1, K2) and a corresponding extreme one of the valley points (B1, B4) are symmetrical to each other relative to a corresponding extreme one of the fingertip points (T1, T5). Specifically, the reference points (K1, K2) are found by first determining a distance between each extreme one of the valley points (B1, B4) and a corresponding extreme one of the fingertip points (T1, T5), and then finding, from among the corrected contour pixels, a pixel which is spaced apart from the corresponding extreme one of the fingertip points (T1, T5) by substantially the same distance as the corresponding extreme one of the valley points (B1, B4), and which is in reverse order along the palm contour 110 from the corresponding extreme one of the fingertip points (T1, T5) as compared to the corresponding extreme one of the valley points (B1, B4). The reference points (K1, K2) found in sub-step 943 are referred also as the "outer reference points" in subsequent descriptions.

In sub-step 944, if it is determined that one of the fingertip points (T~T5) corresponds to an index fingertip point (T4 in FIG. 7), it is found, from among the rotated contour pixels, one pixel as another reference point (K3), which is referred also as the "inner reference point" in subsequent descriptions. The inner reference point (K3) and one of the valley points (B3 in this FIG. 7) which is adjacent to the index fingertip point (T4) and whose distance from the index fingertip point (T4) is smaller than the other one of the valley points (B4 in FIG. 7) adjacent to the index fingertip point (T4) are symmetrical to each other relative to said one of the fingertip points (T4).

Described hereinafter is one way for determining the index fingertip point. When a distance between one of the fingertip points (T1~T5) and one of the valley points (B1~B4) adjacent thereto and a distance between said one of the fingertip points (T1~T5) and the other of the valley points (B1~B4) adjacent thereto differ by an extent which is greater than a predetermined threshold, said one of the fingertip points (T1~T5) is determined to correspond to the index fingertip point. In detail, the inner reference point (K3) is found by first locating the index fingertip point (T4), followed by determining a distance between a closer adjacent one of the valley points (B3) relative to the index fingertip point (T4), and then finding, from among the corrected contour pixels, a pixel which is spaced apart from the index fingertip point (T9) by substantially the same distance as the closer adjacent one of the valley points (B3), and which is in reverse order along the palm contour 110 from the index fingertip point (T4) as compared to the closer adjacent one of the valley points (B3).

Subsequently, with reference to FIG. 6 and FIG. 8, in sub-step 945, for each of the fingertip points (T1~T5), pairs of the corrected contour pixels are found as cross points (F1~F10) that correspond to the fingertip point (T1~T5). Each pair of the corrected contour pixels intersect a corresponding reference line (Lref) which is perpendicular to a symmetry line (Lsym) that extends from the fingertip point (T1~T5) to a midpoint between an adjacent pair of the valley and reference points (B1~B4, K1~K3), and which is spaced apart from the fingertip point (T1~T5) by a distance that is equal to a corresponding fraction of a length of the symmetry line (Lsym).

Figure 8:
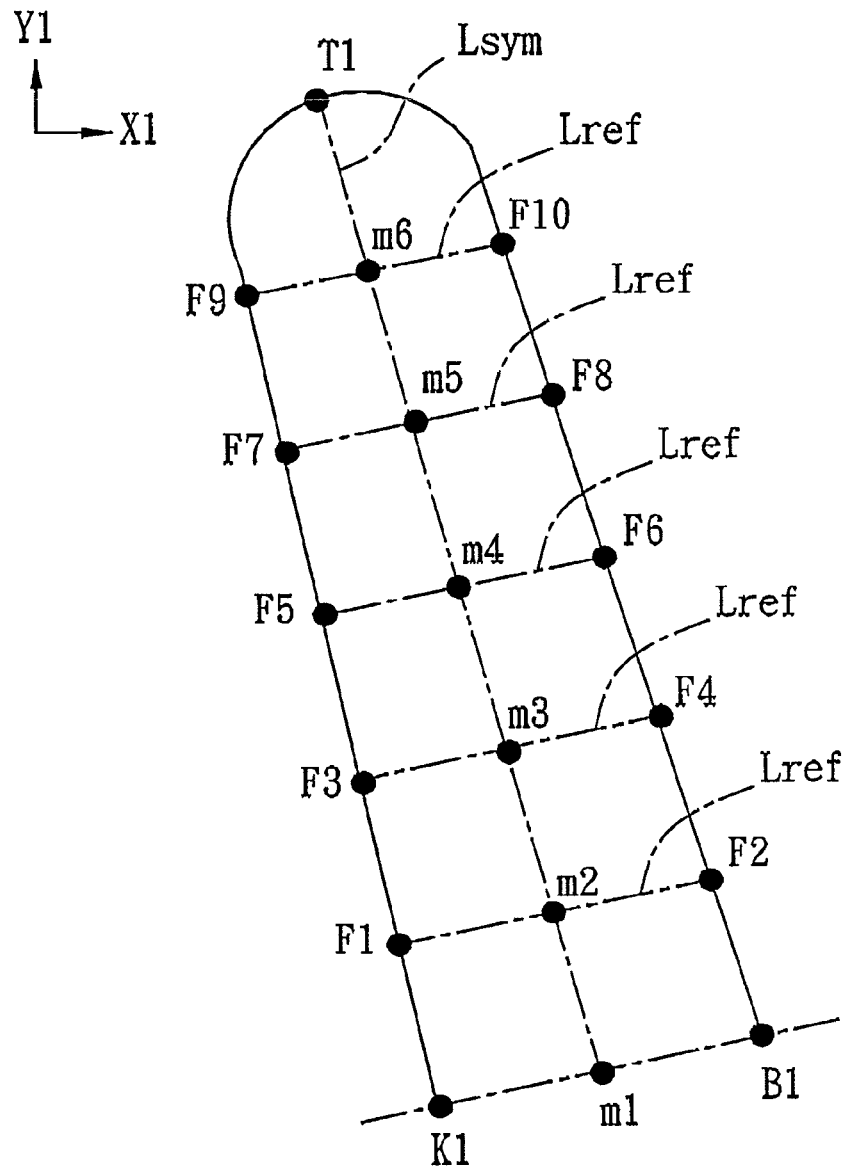
FIG. 8 is a schematic diagram of a first palm finger, illustrating how to find cross points.

Taken as an example to illustrate the step of finding the cross points (F1~F10) in FIG. 8 is the first fingertip point (T1), with its adjacent pair of valley and reference points being (B1) and (K1). First, a midpoint (m1) between the adjacent pair of the valley and reference points (B1, K1) is found. Second, the first fingertip point (T1) and the midpoint (m1) are connected to find the symmetry line (Lsym). Third, a plurality, (five in this embodiment) of equidistant reference points (m2~m6) are found on the symmetry line (Lsym), thereby dividing the symmetry line (Lsym) into six segments. Subsequently, a plurality (five in this embodiment) of reference lines (Lref) are determined, each passing through a corresponding one of the reference points (m2~m6), being perpendicular to the symmetry line (Lsym), and crossing the palm contour 110 at two places, which are set as the cross points (F1~F10). In this example, since there are five reference points (m2~m6), each reference line (Lref) is spaced apart from the first fingertip point (T1) by a distance that is equal to a corresponding fraction (⅙, 2/6, 3/6, 4/6, 5/6) of a length of the symmetry line (Lsym), and a total of ten cross points are found.

Referring back to FIG. 1, among the plurality of sub-images 11 (as shown in FIG. 11) obtained in step 95 from the palm image 10 with reference to the feature points (i.e., the fingertip points (T1~T5), the valley points (B1~B4), and the reference points (K1~K3)), one of the sub-images 11*a* corresponds to a palm center and another one of the sub-images 11*b* corresponds to a corresponding palm finger. In this embodiment, six sub-images 11*a*, 11*b* are obtained to correspond to the palm center and five palm fingers.

Figure 9:
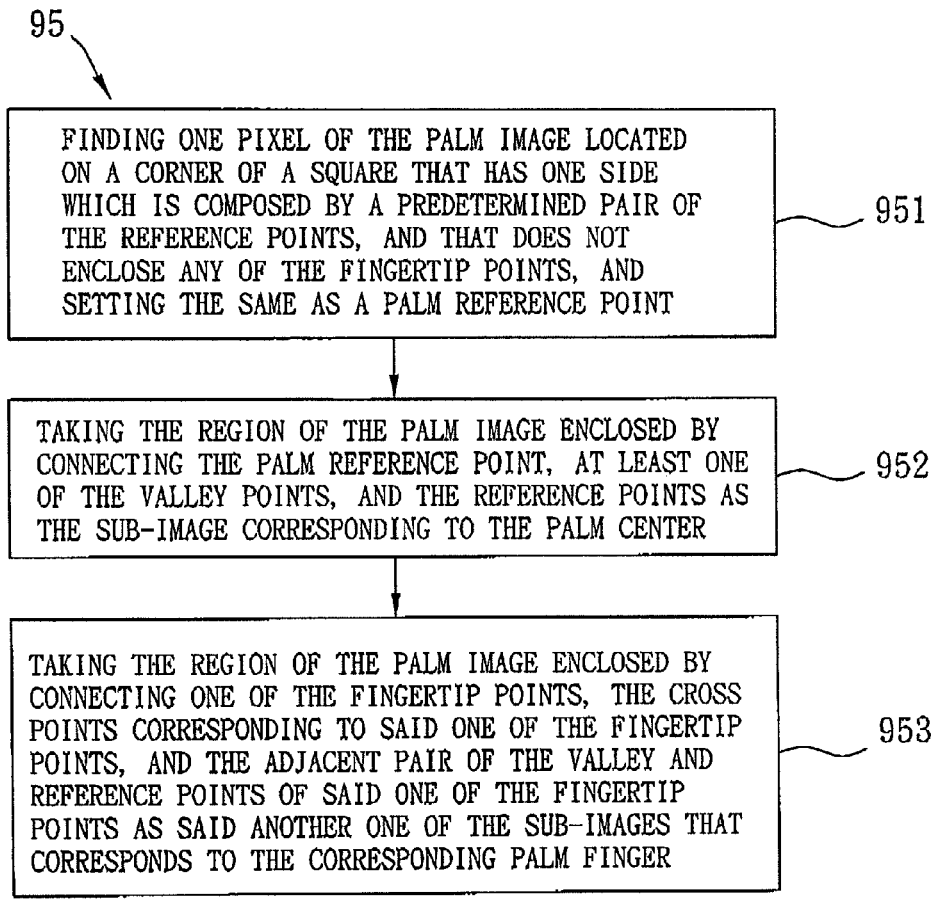
FIG. 9 is a flow chart illustrating the sub-steps of step 95 of the method.
Figure 10:
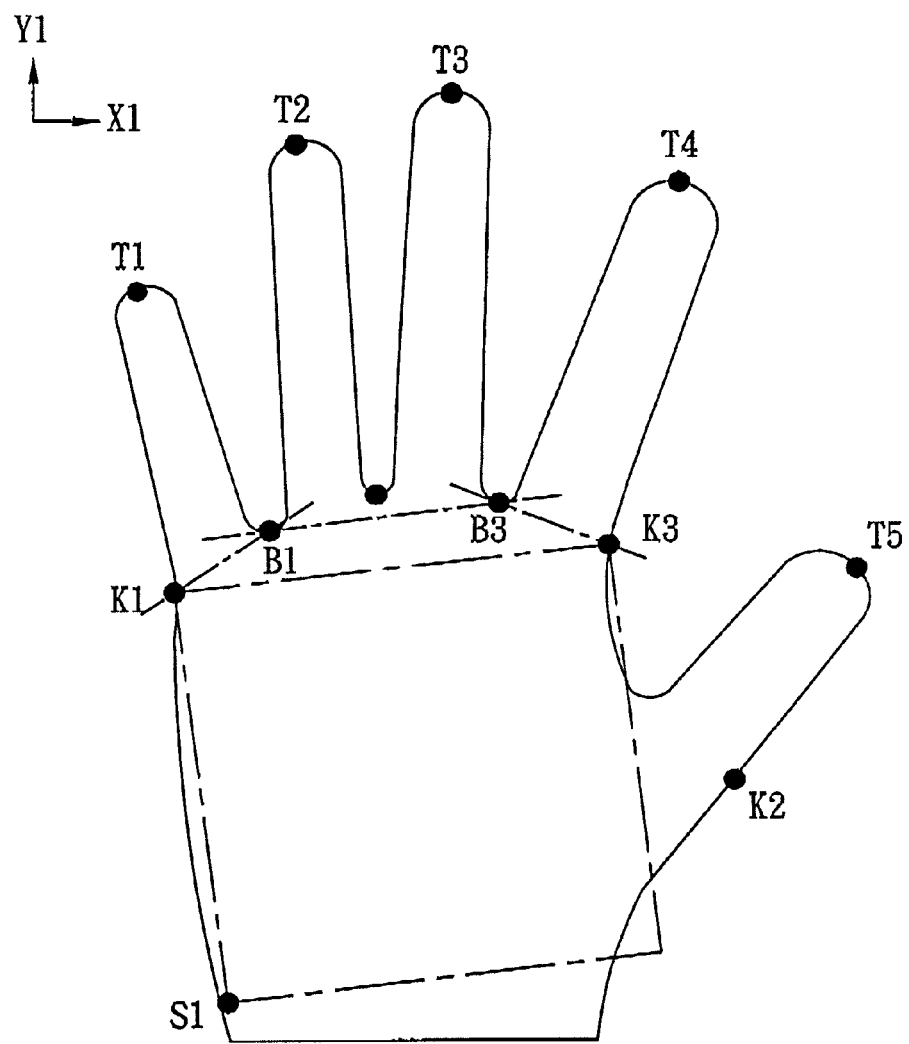
FIG. 10 is a schematic diagram similar to FIG. 7, illustrating how to obtain a sub-image corresponding to a palm center.

With reference to FIG. 9 and FIG. 10, step 95 includes the three sub-steps 951~953.

In sub-step 951, one pixel of the palm image 10 located on a corner of a square that has one side which is composed by a predetermined pair of the reference points (K1, K3), and that does not enclose any of the fingertip points (T1~T5) is found and set as a palm reference point (S1). The corner is diagonally opposite to one of the reference points (K3) in the predetermined pair (K1, K3).

In sub-step 952, the region of the palm image 10 enclosed by connecting the palm reference point (S1), at least one of the valley points (B1~B4), and the reference points (K1~K3) is taken as the sub-image 11*a* corresponding to the palm center. Specifically, referring to FIG. 10 and FIG. 11, the sub-image 11*a* is composed by connecting the palm reference point (B1), the outer reference point (K1), the valley points (B1, B3), the inner reference point (K3) and the outer reference point (K2).

In sub-step 953, the region of the palm image 10 enclosed by connecting one of the fingertip points (T1~T5), the cross points (F1~F10, as shown in FIG. 8) corresponding to said one of the fingertip points (T1~T5), and the adjacent pair of the valley and reference points (B1~B4, K1~K3) of said one of the fingertip points (T1~T5) as said another one of the sub-images 11*b* that corresponds to the corresponding palm finger. Referring to FIG. 8 and FIG. 11, the sub-image 11*b* that corresponds to the first palm finger is composed by connecting the first fingertip point (T1), the cross points (F1~F10) that corresponds to the first fingertip point (T1), the outer reference point (K1) and the valley point (B1).

With reference back to FIG. 1, in this embodiment, the feature vectors are obtained in step 96 according to local fuzzy patter (LFP) texture descriptor. In addition, prior to step 96, there may be an extra step of subjecting the sub-images 11 to lighting normalization according to histogram equalization. For details concerning the computations involved in finding obtaining the feature vectors, please refer to an article entitled "*A Robust Texture-Based Background Subtraction for Moving Object Detection in Video Sequences*" by LIU, C.-Y. and published in "I SHOU UNIVERSITY, Information Engineering Department" in 2007.

It should be noted herein that FIGS. 7, 8, 10 and 11 are drawn to illustrate the palm image 10 in said another coordinate system (X1-Y1) to demonstrate the correction/rotation to offset the rotation angle for the sake of simplicity of illustration.

According to the present invention, there is also provided a computer program product comprising a computer readable storage medium that includes program instructions, which when executed by an electronic device, cause the electronic device to perform the above-described method.

While the present invention has been described in connection with what is considered the most practical and preferred embodiment, it is understood that this invention is not limited to the disclosed embodiment but is intended to cover various arrangements included within the spirit and scope of the broadest interpretation so as to encompass all such modifications and equivalent arrangements.

What is claimed is:

1. A method for extracting feature vectors from a palm image, the method comprising the steps of:
    (A) determining a palm contour in the palm image, and labeling pixels on the palm contour as contour pixels in order along the palm contour;
    (B) determining a rotation angle of the palm contour relative to a coordinate system;
    (C) obtaining corrected contour pixels to offset the rotation angle;
    (D) determining a plurality of feature points from the corrected contour pixels;
    (E) obtaining a plurality of sub-images from the palm image with reference to the feature points, one of the sub-images corresponding to a palm center and another one of the sub-images corresponding to a corresponding palm finger; and
    (F) determining the feature vectors with reference to the sub-images, each of the feature vectors corresponding to a corresponding one of the sub-images; wherein step (D) includes the sub-steps of
    (D-1) setting local maxima of the corrected contour pixels as fingertip points,
    (D-2) setting local minima of the corrected contour pixels located between two of the fingertip points as valley points,
    (D-3) finding, from among the corrected contour pixels, two pixels as reference points (K1, K3), each of the reference points and a corresponding extreme one of the valley points being symmetrical to each other relative to a corresponding extreme one of the fingertip points,
    (D-4) if it is determined that one of the fingertip points corresponds to an index fingertip point, finding, from among the rotated contour pixels, one pixel as another reference point, said another reference point and one of the valley points which is adjacent to said one of the fingertip points and whose distance from said one of the fingertip points is smaller than the other one of the valley points adjacent to said one of the fingertip points being symmetrical to each other relative to said one of the fingertip points, and (D-5) for each of the fingertip points, finding pairs of the corrected contour pixels as cross points that correspond to the fingertip point, each pair of the corrected contour pixels intersecting a corresponding reference line which is perpendicular to a symmetry line that extends from the fingertip point to a midpoint between an adjacent pair of the valley and reference points, and which is spaced apart from the fingertip point by a distance that is equal to a corresponding fraction of a length of the symmetry line; and wherein step (E) includes the sub-steps of (E-1) finding one pixel of the palm image located on a corner of a square that has one side which is composed by a predetermined pair of the reference points, and that does not enclose any of the fingertip points, and setting said one pixel as a palm reference point, the corner being diagonally opposite to one of the reference points in the predetermined pair, (E-2) taking the region of the palm image enclosed by connecting the palm reference point, at least one of the valley points, and the reference points as the sub-image corresponding to the palm center, and (E-3) taking the region of the palm image enclosed by connecting one of the fingertip points, the cross points corresponding to said one of the fingertip points, and the adjacent pair of the valley and reference points of said one of the fingertip points as said another one of the sub-images that corresponds to the corresponding palm finger.

2. The method as claimed in claim 1, wherein, in sub-step (D-4), said one of the fingertip points corresponds to the index fingertip point if it is determined that a distance between said one of the fingertip points and one of the valley points adjacent thereto and a distance between said one of the fingertip points and the other of the valley points adjacent thereto differ by an extent which is greater than a predetermined threshold.

3. The method as claimed in claim 1, wherein the rotation angle of the palm contour relative to a coordinate system is determined with reference to the contour pixels in step (B).

4. The method as claimed in claim 3, where in step (B) includes the sub-steps of:

(B-1) determining whether fingers in the palm image point upward or downward relative to the coordinate system;

(B-2) determining a slope of each of two of the fingers in the palm image relative to the coordinate system;

(B-3) averaging the slopes of the two of the fingers in the palm image as determined in sub-step (B-2); and (B-4) determining the rotation angle of the palm contour relative to the coordinate system with reference to the average of the slopes as found in sub-step (B-4) according to the Pythagorean theorem.

5. The method as claimed in claim 4, wherein sub-step (B-1) includes the sub-steps of:

(B-1-1) setting a line that extends in a horizontal direction of the coordinate system and that intersects the palm contour as determined in step (A) at a predetermined number of locations as a direction reference line;

(B-1-2) finding, from among the contour pixels, one pixel that has a first coordinate component which is between those of a predetermined pair of the locations;

(B-1-3) determining that the fingers in the palm image point upward relative to the coordinate system when a second coordinate component of the pixel found in sub-step (B-1-2) is smaller than those of the predetermined pair of the locations; and (B-1-4) determining that the fingers in the palm image point downward relative to the coordinate system when the second coordinate component of the pixel found in sub-step (B-1-3) is greater than those of the predetermined pair of the locations.

6. The method as claimed in claim 5, wherein when it is determined in sub-step (B-1) that the fingers in the palm image point upward, sub-step (B-2) includes the sub-steps of:

(B-2-1) finding a pixel located approximately midway on the direction reference line between another predetermined pair of the locations;

(B-2-2) finding, from among the contour pixels whose order along the palm contour is between said another predetermined pair of the locations, one pixel which is farthest from the pixel found in sub-step (B-2-1);

(B-2-3) determining a slope of a line connecting the pixel found in sub-step (B-2-1) and the pixel found in sub-step (B-2-2) to be one of the slopes;

(B-2-4) finding a pixel located approximately midway on the direction reference line between a further predetermined pair of the locations;

(B-2-5) finding, from among the contour pixels, one pixel which is farthest from the pixel found in sub-step (B-2-4); and (B-2-6) determining a slope of a line connecting the pixel found in sub-step (B-2-4) and the pixel found in sub-step (B-2-5) to be another one of the slopes.

7. The method as claimed in claim 5, wherein when it is determined in sub-step (B-1) that the fingers in the palm image point downward, sub-step (B-2) includes the sub-steps of:

(B-2-1) finding a pixel located approximately midway on the direction reference line between another predetermined pair of the locations;

(B-2-2) finding, from among the contour pixels whose order along the palm contour is between said another predetermined pair of the locations, one pixel which is farthest from the pixel found in sub-step (B-2-1);

(B-2-3) determining a slope of a line connecting the pixel found in sub-step (B-2-1) and the pixel found in sub-step (B-2-2) to be one of the slopes;

(B-2-4) finding a pixel located approximately midway on the direction reference line between a further predetermined pair of the locations;

(B-2-5) finding, from among the contour pixels whose order along the palm contour is between said further predetermined pair of the locations, one pixel which is farthest from the pixel found in sub-step (B-2-4); and (B-2-6) determining a slope of a line connecting the pixel found in sub-step (B-2-4) and the pixel found in sub-step (B-2-5) to be another one of the slopes.

8. The method as claimed in claim 5, wherein the predetermined number of locations is eight.

9. The method as claimed in claim 1, wherein step (A) includes the sub-steps of:

(A-1) converting the palm image into a binary image;

(A-2) performing median filtering on the binary image;

(A-3) performing edge detection on the binary image to determine the palm contour; and (A-4) labeling pixels on the palm contour as the contour pixels.

10. The method as claimed in claim 1, further comprising the step of (G) prior to step (F): subjecting the sub-images to lighting normalization.

11. The method as claimed in claim 1, wherein the feature vectors are obtained instep (F) according to local fuzzy patter (LFP) texture descriptor.

12. A computer program product, comprising a non-transitory computer readable storage medium that includes program instructions, which when executed by an electronic device, cause the electronic device to perform a method comprising the steps of:
- (A) determining a palm contour in the palm image, and labeling pixels on the palm contour as contour pixels in order along the palm contour;
- (B) determining a rotation angle of the palm contour relative to a coordinate system;
- (C) obtaining corrected contour pixels to offset the rotation angle;
- (D) determining a plurality of feature points from the corrected contour pixels;
- (E) obtaining a plurality of sub-images from the palm image with reference to the feature points, one of the sub-images corresponding to a palm center and another one of the sub-images corresponding to a corresponding palm finger; and
- (F) determining the feature vectors with reference to the sub-images, each of the feature vectors corresponding to a corresponding one of the sub-images; wherein step (D) includes the sub-steps of
  - (D-1) setting local maxima of the corrected contour pixels as fingertip points,
  - (D-2) setting local minima of the corrected contour pixels located between two of the fingertip points as valley points,
  - (D-3) finding, from among the corrected contour pixels, two pixels as reference points (K1, K3), each of the reference points and a corresponding extreme one of the valley points being symmetrical to each other relative to a corresponding extreme one of the fingertip points,
  - (D-4) if it is determined that one of the fingertip points corresponds to an index fingertip point, finding, from among the rotated contour pixels, one pixel as another reference point, said another reference point and one of the valley points which is adjacent to said one of the fingertip points and whose distance from said one of the fingertip points is smaller than the other one of the valley points adjacent to said one of the fingertip points being symmetrical to each other relative to said one of the fingertip points, and
  - (D-5) for each of the fingertip points, finding pairs of the corrected contour pixels as cross points that correspond to the fingertip point, each pair of the corrected contour pixels intersecting a corresponding reference line which is perpendicular to a symmetry line that extends from the fingertip point to a midpoint between an adjacent pair of the valley and reference points, and which is spaced apart from the fingertip point by a distance that is equal to a corresponding fraction of a length of the symmetry line; and wherein step (E) includes the sub-steps of
- (E-1) finding one pixel of the palm image located on a corner of a square that has one side which is composed by a predetermined pair of the reference points, and that does not enclose any of the fingertip points, and setting said one pixel as a palm reference point, the corner being diagonally opposite to one of the reference points in the predetermined pair,
- (E-2) taking the region of the palm image enclosed by connecting the palm reference point, at least one of the valley points, and the reference points as the sub-image corresponding to the palm center, and
- (E-3) taking the region of the palm image enclosed by connecting one of the fingertip points, the cross points corresponding to said one of the fingertip points, and the adjacent pair of the valley and reference points of said one of the fingertip points as said another one of the sub-images that corresponds to the corresponding palm finger.

* * * * *